United States Patent [19]

Linderer

[11] Patent Number: 5,511,704
[45] Date of Patent: Apr. 30, 1996

[54] BELT HOLDER FOR CELLULAR PHONE

[76] Inventor: John E. Linderer, 1324 Empire St., Fairfield, Calif. 94533

[21] Appl. No.: 369,496

[22] Filed: Jan. 6, 1995

[51] Int. Cl.$^6$ ............................ B65D 25/10; A45F 5/00
[52] U.S. Cl. ...................... 224/245; 224/253; 224/240; D3/218
[58] Field of Search ................... 224/224, 228, 224/240, 242, 245, 250, 253, 251, 929; D3/215, 218, 219, 229, 230, 265, 266, 267

[56] References Cited

U.S. PATENT DOCUMENTS

| | | | |
|---|---|---|---|
| D. 316,999 | 5/1991 | Sarff | D14/253 |
| D. 329,542 | 9/1992 | Jayex | D3/106 |
| D. 343,291 | 1/1994 | Langford | D3/106 |
| D. 346,815 | 5/1994 | Wake | D3/265 |
| 1,486,470 | 3/1924 | Welch | 224/224 |
| 1,781,816 | 11/1930 | Jovino | 224/245 |
| 2,644,623 | 7/1953 | White | 224/242 |
| 3,977,516 | 8/1976 | Tilve | 224/240 |
| 4,264,024 | 4/1981 | Harris, Jr. | 224/250 |
| 4,485,946 | 12/1984 | Liautaud et al. | 224/242 |
| 4,862,519 | 9/1989 | Bull | 224/224 |
| 5,395,023 | 3/1995 | Naymark et al. | 224/245 |

*Primary Examiner*—Henry J. Recla
*Assistant Examiner*—Gregory M. Vidovich
*Attorney, Agent, or Firm*—Joseph H. McGlynn

[57] ABSTRACT

A holder for detachably affixing a portable apparatus, such as a cellular phone, to a person wherein the holder is an open cylinder-like body portion with opposite open ends that are partially closed by a pair of curved resilient end pieces that automatically adjust to different sizes of phones, and a fastener for holding the cylinder-like body portion closed. When the phone is inserted into the holder the antenna will protrude through the partially open ends and the phone will be secured in a horizontal position parallel to a person's waist,

3 Claims, 1 Drawing Sheet

BELT HOLDER FOR CELLULAR PHONE

BACKGROUND OF THE INVENTION

This invention relates in general to belt holders for portable radio apparatus, and more specifically to belt holders for cellular phone apparatus wherein the phone is engaged in the holder during transit and can be easily removed by the wearer when it is necessary to use the phone.

DESCRIPTION OF THE PRIOR ART

In recent years cellular phones and similar battery operated radio apparatus have come into general use for a wide variety of applications. Policeman, firemen, business and professional people as well as the ordinary citizen routinely carry cellular phones while performing their duties to satisfy a need for instant and reliable communication in the regular course of business, or in an emergency. In order to maximize the effectiveness of such devices it is desirable that cellular phones be within easy reach, which necessitates the user carrying the cellular phones with him or her. The usual practice has been to carry the cellular phone in some form of holder so it can be carried on the user within easy reach.

The usual form of holder for cellular phones consists of a vertical leather pouch or holster clipped to the belt of the user, into which the phone is placed when not in use. The configuration of the pouch requires that the phone be carried in an upright position, and the antenna which, typically, extends from the top surface of the cellular phones extends above the belt line of the wearer. This interferes with the freedom of movement of the user and may result in discomfort during certain activities such as sitting, driving, or riding in an automobile.

However, if the cellular phone carrying case is attached to the user's belt in a horizontal position, the entire unit, including the antenna portion if extended, is parallel to the wearer's waist. This position results in greater freedom of movement and comfort to the wearer regardless of body position. If worn in the front, it doesn't interfere with walking and the normal arm movement. If worn while sitting, the antenna will not be in the way of arm movements while driving a car, for example.

Also, cellular phones are expensive and can be damaged if dropped. Consequently, in order to avoid loss or damage to the unit it is desirable to keep the cellular phones securely fastened to the user's person. In this way it won't fall and be damaged or be forgotten or lost.

Also, cellular phones come in many different sizes and shapes, and it would be desirable to have a single holder that automatically adjusts to different cellular phones.

SUMMARY OF THE INVENTION

This invention relates to a holder for cellular phones that positions the phone in a horizontal position on the wearer's belt, so the antenna is out of the way and will not interfere with normal arm movements. It consists of an open cylinder-like body portion with opposite partially open ends. The body portion is held closed around an inserted cellular phone by means of a fastener such as Velcro. The open ends are partially closed with curved elastic flaps, with the curved portion extending into the interior of the body portion. Two slots are formed in the body portion so it can be place on a belt.

It is an object of the present invention to provide a belt holder for cellular phones which securely holds the phone when it is not in use and yet allows ready access regardless of body position.

It is an object of the present invention to provide a belt holder for cellular phones which maintains the phone in a horizontal position, parallel to the wearer's waist, to keep the antenna out of the way.

These and other objects and advantages of the present invention will be fully apparent from the following description, when taken in connection with the annexed drawings.

DESCRIPTION OF THE PREFERRED EMBODIMENT

Figure 1:
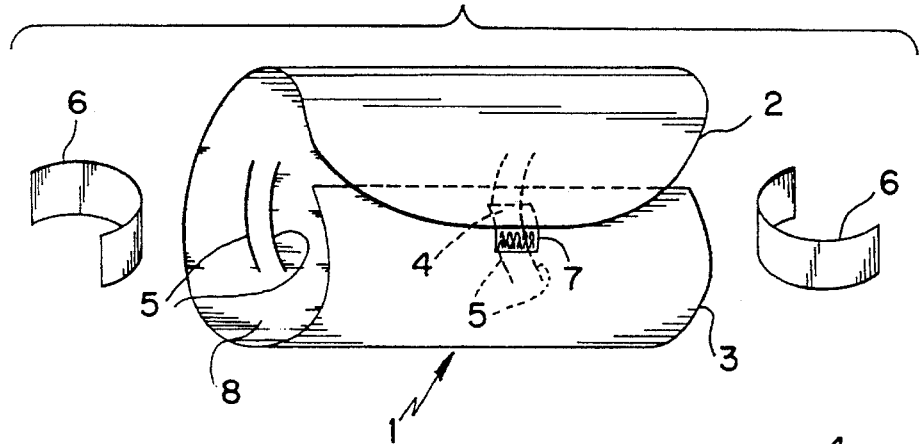
FIG. 1 is an exploded perspective view of the cellular phone holder.
Figure 2:
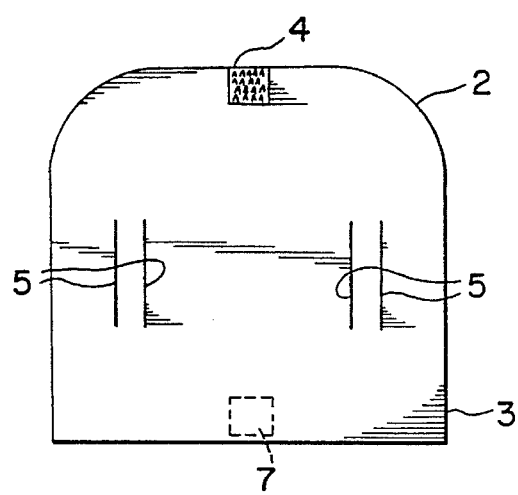
FIG. 2 is a plan view of the body of the cellular phone holder with the end pieces removed.

The cellular phone holder 1 of the present invention is shown in an exploded view in FIG. 1. The body portion has an upper curved portion 2 which overlaps a lower portion 3 in order to hold a cellular phone in the holder. On the back of the holder are a pair of slots 5 at each end, through which a belt may be threaded to mount the holder on a person. The open ends 8 of the holder are partially closed by a pair of end pieces 6. The overlapping upper and lower portions 2 and 3 have cooperating fasteners 4 and 7, respectively, which will secure the overlapping upper and lower portions 2 and 3 in a closed position. Any conventional fastener such as, but not limited to, Velcro, snaps or buttons may be used to secure the portions 2 and 3. As can be clearly seen in FIG. 1, the preferred fastener is Velcro, and the Velcro part 7 on the lower portion 3 is longer than the Velcro part 4 on the upper portion of the body. This will allow the body part to be adjustable for different sizes of phones.

Figure 3:
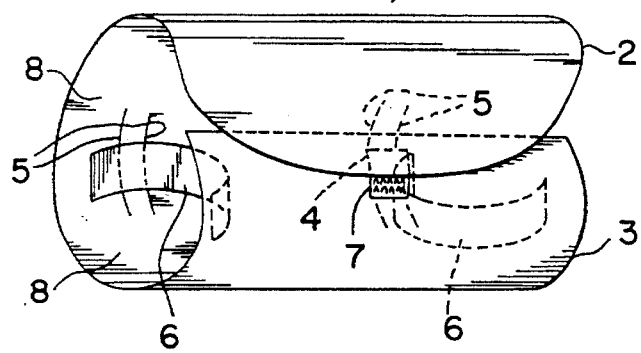
FIG. 3 is a perspective view of the cellular phone holder in a closed position.
Figure 4:
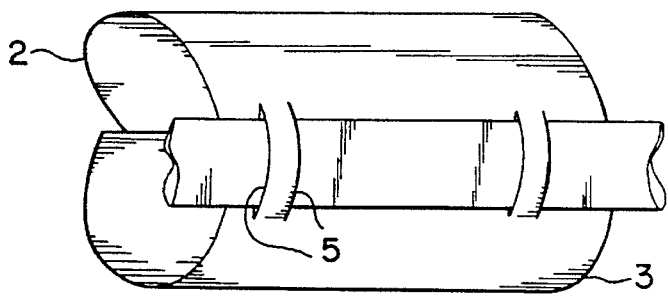
FIG. 4 is a view of the holder with a belt secured thereto, as seen from the back of the holder.

As can be seen in FIGS. 1 and 3, the end pieces 6 are curved with the convex part facing into the interior of the body portion. The end pieces are made from a resilient material such as, but not limited to, rubber or plastic. As can be seen in FIG. 3, the convex portion of each end piece protrudes into the body portion of the holder so phones of different lengths will be snugly held and will not slide back and forth during normal activities by the wearer. The position of the end pieces 6 is not critical as long as there is an open area between the top of the end pieces and the top portion of the body of the holder.

There should also be an opening between the bottom of the end pieces and the lower portion of the holder, as shown in FIG. 3. The upper open area allows an extended antenna to protrude out of the holder when the cellular phone is positioned in the holder. The lower open area allows the holder to easily be turned inside out to expose a different exterior. When the holder is turned inside out, the upper portion 2 will be placed inside lower portion 3 when the holder is closed. Therefore the lower portion 3 becomes the outer overlapping part. The cooperating fasteners 4 and 7 secure the upper and lower parts 2 and 3 as described above.

To use the cellular phone holder 1, a person first slides the holder on a belt by passing the belt through the slots 5 and then securing the belt. Next the upper portion 2 of the holder is opened, the antenna is placed on top of one of the end pieces 6, and the end of the phone opposite the antenna is pushed down into the holder against the resilient pressure exerted by the convex portion of the end piece. Then the upper portion of the body 2 is overlapped with the lower portion of the body 3 and secured. It should be noted, since both ends of the body portion have end pieces 6, the holder can be mounted on either the right or left side of a person's body, and the antenna can be positioned toward the front or back of the person's body. This is a matter of personal preference and the holder will accommodate whatever is most comfortable for the individual.

Although the cellular phone holder and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A holder for detachably affixing a portable apparatus with an attached antenna to a person comprising:

a body portion having a top edge and a bottom edge and opposite first and second ends, means on said body portion for attaching said holder to said person, means for detachably securing said top edge adjacent to said bottom edge, a cavity being formed when said top edge is secured adjacent to said bottom edge, said cavity having open first and second ends and a longitudinal axis extending between said open first and second ends, resilient means for partially closing said open first and second ends, each of said resilient means comprising a member having a first end and a second end, each of said first ends of said members being attached to said body portion adjacent, said means for attaching said holder to said person, each of said second ends of said members being attached to said body portion opposite from said means for attaching said holder to said person, said resilient means for partially closing said open first and second ends are separate, rectangular elements, each of said rectangular elements is curved and the convex part of each of said rectangular elements face each other and protrude into said cavity, whereby a portable apparatus with an attached antenna is adapted to be inserted into and secured within said holder in a horizontal position with said antenna protruding through one of said opposite first and second ends.

2. The holder of claim 1 wherein, there is an opening between a top portion of each of said resilient means and said upper portion, whereby the antenna is adapted to protrude out of said holder.

3. The holder of claim 1 wherein, there is an opening between a bottom portion of each of said resilient means and said lower portion, whereby the holder is adapted to be easily turned inside out.

* * * * *